United States Patent [19]
Moore et al.

[11] Patent Number: 5,771,181
[45] Date of Patent: Jun. 23, 1998

[54] GENERATION FOR VIRTUAL REALITY SIMULATOR SYSTEMS

[76] Inventors: Robert S. Moore, 7313 16th N.W., Seattle, Wash. 98117; Lewis John Harthan, III, 830 Kirkland Way, #204, Kirkland, Wash. 98033; Darrell L. Livezey, 2901 4th Ave. West, Seattle, Wash. 98119

[21] Appl. No.: 355,612

[22] Filed: Dec. 14, 1994

[51] Int. Cl.$^6$ ................... G06G 7/48; B25J 9/18
[52] U.S. Cl. .......... 364/578; 364/806; 364/474.03; 318/568.11; 318/568.1; 395/95; 395/99; 901/34; 901/9
[58] Field of Search ............... 364/578, 806, 364/474.03, 474.37, 413.13, 413.28, 413.02, 413.19, 413.01; 395/99, 95, 80, 94, 924, 89, 93, 96, 161, 157, 159; 345/156; 434/45; 414/5, 4, 699, 730; 901/34, 7, 9, 2, 4; 318/568.11, 568.1, 590

[56] References Cited

U.S. PATENT DOCUMENTS

| | | | |
|---|---|---|---|
| 4,362,084 | 12/1982 | Walters | 91/47 |
| 4,504,233 | 3/1985 | Galus et al. | 434/45 |
| 5,019,761 | 5/1991 | Kraft | 318/568.11 |
| 5,143,505 | 9/1992 | Burdea et al. | 414/5 |
| 5,184,319 | 2/1993 | Kramer | 364/578 |
| 5,354,162 | 10/1994 | Burdea et al. | 414/5 |
| 5,389,865 | 2/1995 | Jacobus et al. | 318/568.11 |
| 5,459,382 | 10/1995 | Jacobus et al. | 318/568.11 |
| 5,497,336 | 3/1996 | Andersson et al. | 364/474.03 |

OTHER PUBLICATIONS

Bostrom et al: Design of an interactive lumbar puncture simulator with tactile feedback, IEEE, Jan. 1993.

Singh et al: Design of an interactive lumbar ouncture simulator with tactile feedback, IEEE, Jul. 1993.

Singh et al: Design of an interactive lumbar puncture simulator with tactile feedback, IEEE, Jan. 1994.

*Primary Examiner*—Jacques H. Louis-Jacques
*Attorney, Agent, or Firm*—Crutsinger & Booth

[57] ABSTRACT

A system for producing realistic tactile feedback forces in a tool operation simulator. Sensors sense the location and direction of movement of a simulated tool in a simulated landscape environment to produce electrical signals representing three dimensional location and direction of movement. These electrical signals are processed by re-programmable processors to produce control signals that are fed to pneumatic bi-directional piston-type actuators to impart realistic forces similar to forces that would be encountered in corresponding real-life movement of the simulated tool.

22 Claims, 4 Drawing Sheets

GENERATION FOR VIRTUAL REALITY SIMULATOR SYSTEMS

This invention relates to force feedback for virtual reality and more particularly to simulation employing realistic force feedback that may be used in training personnel in instrument manipulation and other techniques.

BACKGROUND OF THE INVENTION

Minimally invasive surgery and procedures often involve more precise manipulation of tools and instruments than open incision surgery since the point of manipulation (which is external) often is relatively remote from the tissue being examined or treated the latter, of course, being internal. Thus, manual feel, cause and effect are not instructively intertwined, for the point at which manipulation of the medical instrument occurs is located a substantial distance from the point of contact or observation within the patient, thus imparting a level of remoteness and indirection which requires a particularly high level of skill by the medical practitioner. For these reasons, the training of practitioners using live human subjects is more dangerous in that errors and mistakes are much more difficult to correct or overcome.

Although training on animal subjects such as pigs is helpful, it is of limited availability. Furthermore, practice on live subjects does not offer repeatable or "staged" situations for iterative practice. Accordingly, simulator systems with lifelike characteristics become highly desirable.

A useful and practical simulation system for minimally invasive surgical techniques should:

(1) Define an environment in which activities are to be simulated, the allowable limits within which changes in that environment are controlled, and the movement of maneuverable bodies therein;

(2) Define allowable movements of manipulated "instruments" and provide physical constancy;

(3) Determine the position within or relative to the defined environment of manipulated "instruments";

(4) Provide one or more sensory (tactile, aural, and visual) simulation stimuli to the user with any change in the position determined in (3) above within the confines defined by (1) and (2) above; and (5) Re-define (1) and (2) above if change limits are exceeded.

In a complete system, there should first be presented to the user a simulation of the external appearance of the subject, i.e., a physical simulation of the human torso simulating as nearly as possible the colored skin surface texture, and the under skin muscle, bone and body cavity feel. Also presented should be simulated instrument handle portions that should be of the same configuration as actual instrument handles. These handles optionally may be equipped with appropriate instrumentation as necessary or desirable and may already be in position protruding from the simulated torso when the user is familiar with the initial insertion and location techniques of the instruments.

The only view and feel of the interior working area that a surgeon is provided in actual surgery is through a television monitor and tactile physical feedback through the instrument handles he is manipulating. The interior simulations need not be provided by interior physical reproductions or even physical analogs but are adaptable to synthetic sensations electronically produced in response to manipulation of the simulated instrument (i.e., implement) handles.

For tactile response simulation, defining digital data for one or more simulated instruments to be used including their dimensions, movement limits and active functions such as grasp, clamp, cut and other manipulative functions may be stored in high speed accessible electronic memory. Environment-defining digital data for areas of use immediately surrounding the defined instruments such as "clear" areas, objects (organs, etc.), position, shape and texture and their give and resilience and movement-resistant forces and interactive connections with other objects likewise may be stored in high speed accessible electronic memory.

Simulation for visual displays may comprise "multilayer" background "landscape" video information that may be actual photographic data digitized and stored in laser disc, electronic or other types of memory. The multilayer arrangement provides means to provide a sense of depth in the two-dimensional display through relative movement and interaction with computer graphic anatomical objects in the layers, such as organs.

Additional stored visual data is required to provide visual representation of the immediate work area, e.g., the internal landscape, for the surgeon, including specific organs and anatomy to be worked on. This data, likewise may be wholly photographic data or partially photographic data such as tissue textures, stored in digital form.

The manipulatable visual information may be provided through a process of computer animation whereby data from "position" sensors and realistic defining photographic data is used to create and present visual and tactile representations showing the actions and movement of the "unseen" portions of the simulated instruments being manipulated by the simulator user.

Additionally, computer animation may be used to create and present a visual representation of the "focus" organ or anatomical region to be manipulated and operated on by the user through the simulated instrument and to show the results on that "focus" region of the implement manipulation using data from the implement position sensors and defining data of the anatomical region.

To complete the simulation, data processors may be used to provide interactions necessary to coordinate the tactile and visual feedbacks and presentations to the simulation user for the real time simulation of an actual surgical operation or other procedure under the control of the user. A comprehensive system embodying the foregoing criteria is described in co-pending U.S. patent application Ser. No. 08/341,686 filed filed Nov. 17, 1994 for MEDICAL PROCEDURE SIMULATOR by Robert S. Moore, Lewis J. Harthan, III and Darrell L. Livezey, inventors of the present application and co-inventors John E. Staneff, Jr., Robert F. Jones, David L. Ludke and Leo R. Catallo, the disclosure of which is incorporated herein by reference. However, certain features of the tactile force feedback proposals hereof are deemed to have applicability in areas beyond those of surgical procedure simulation and diagnosis. Thus, the present invention may be directed to sensing, processing and providing simulations of feel for a variety of procedures.

BRIEF SUMMARY OF THE INVENTION

The tactile force feedback system according to the invention hereof provides a realistic feel to simulated procedures by monitoring the relative positions of relevant parts of the equipment being used, for example, the positions of simulated instruments relative to body organs, accessing a data bank to obtain indicia representing real life forces that would be encountered in corresponding real-life situations, and imparting to such simulated instruments forces that would be occasioned in real life, for example in actions such as tugging, tearing, cutting, clipping, stapling, pulling, pushing, grasping probing and making contact. It also can be used with procedures such as turning, twisting, torquing, mounting, and the like when its principles are extended to mechanical applications. However, in the preferred embodiment hereof, it is directed to a simulated body cavity and real-time video, scopes, surgical and simulated therapeutic instruments (i.e., implements), foot pedals for cautery and fluoroscopy and realistic torsos that house both sophisticated sensors for scopes and changeable implements, the tactile force feedback providing realistic feel when implements (i.e., simulated instruments) are manipulated and contact body parts. In so doing, it makes use of computers and sophisticated electronics such as field programmable gate arrays (hereinafter FPGA's) to which sensors and force controllers are connected in groups herein referred to as pods.

Interconnected with the computers are high capacity memories adapted for storing a myriad of different anatomical "pavilions" (i.e., areas of the body that allow remote procedures). Each of these anatomical pavilions is likewise extendible to a number of minimally invasive procedures, diagnostic and therapeutic, for which anatomical landscapes, virtual organs and a variety of simulated instruments may be created in virtual reality.

Although in the preferred illustrative embodiment hereof, the principles of the invention are utilized in providing tactile force and feel for medical procedures, it will be apparent that the aforementioned high capacity memories could readily store information on mechanical pavilions. However, returning to the preferred embodiment, computers and the field programmable gate arrays (FPGA's) provide a basic platform that can also be used for multimedia training in auxiliary medical areas. These include Endoscopic Retrograde Cholangiopancreatography (ERCP) for viewing internal bile and pancreatic ducts and Sphincterotomy for cutting and widening bile and pancreatic ducts for better drainage or stone removal; Laparoscopic Surgical Skills and landscapes for the lungs, the heart, male and female reproductive organs, arthroscopic surgical areas such as the shoulder, eye surgeries, ear, nose and throat procedures and neuroscopic procedures.

The system according to the invention additionally embodies realistic real-time force-feel representations of organ movement and response to tugging, pulling, cutting and the like.

As mentioned above, there is imparted to implement manipulation a realistic real-life and real-time simulation of forces to which the simulated instrument would be subjected in actual manipulation and surgery. In addition to the aforementioned pods, there are provided a sophisticated dynamics model that defines the shape and other characteristics of organs and other relevant portions of the landscape so that forces on impact, collision, contact cutting and the like are faithfully developed and transmitted to the handles or other portions of the implements being manipulated by the user.

Accordingly, the present invention provides a cost effective enhanced level of life-like virtual simulation that provides real time realism in patient simulation, realistic landscapes, and physical character including tactile force feedback.

OBJECTS AND FEATURES OF THE INVENTION

It is one general object of the invention to improve realism in simulation systems.

It is another object of the invention to reduce costs of such systems.

It is yet another object of the invention to increase versatility in such systems.

It is yet another object of the invention to provide for ready extension and adaptation of such systems to a variety of procedures.

Accordingly, in accordance with one feature of the invention, a plurality of off-the-shelf programmable arrays are employed to interact with sensors and controllers, thereby reducing cost and enhancing flexibility and extendibility.

In accordance with another feature of the invention, the aforementioned programmable arrays are interconnected with high capacity memories in which physical qualities of relevant parts of work subjects, e.g., simulated patient internal landscapes, are modeled and stored, thereby providing such programmable arrays with information with which to produce life-like force-representing indices.

In accordance with another feature of the invention, sensors and force-producing elements are connected in groups to individual discrete programmable arrays, thus providing subgroups herein referred to as pods and increasing efficiency of the overall system.

In accordance with still a further feature of the invention, the aforementioned force-producing elements employ compressible fluids in producing forces, thereby contributing to production of life-like feel.

In accordance with yet one further feature of the invention, a plurality of pods may be interconnected with each other and with a host computer through conventional small computer interfaces using data word packets, thus contributing to flexibility, utility and low cost.

In accordance with still another feature of the invention, a variety of selectible simulated instruments may be conditioned to include life-like force feel in real time, thus contributing to faithful simulation.

In accordance with yet one further feature of the invention, realistic tactile force feedback is provided in real time to the system user, thus providing a realistic feel to procedures such as tugging, tearing, cutting, clipping, stapling, pulling, pushing, grasping and probing.

In accordance with still another feature of the invention, the ready reprogrammability of the individual discrete programmable arrays or similar electronics facilitates switching between different modes of operation such as between a diagnostic and therapeutic mode, thus facilitating versatility and extendability of operation.

In accordance with yet another feature of the invention, the aforementioned reprogrammability facilitates complete or partial selective disablement of force feedback for selected procedures, thus contributing to versatility.

These and other objects and features of the invention will be apparent from the following description, by way of example of a preferred embodiment, with reference to the drawing.

DESCRIPTION OF A PREFERRED EMBODIMENT

Figure 1:
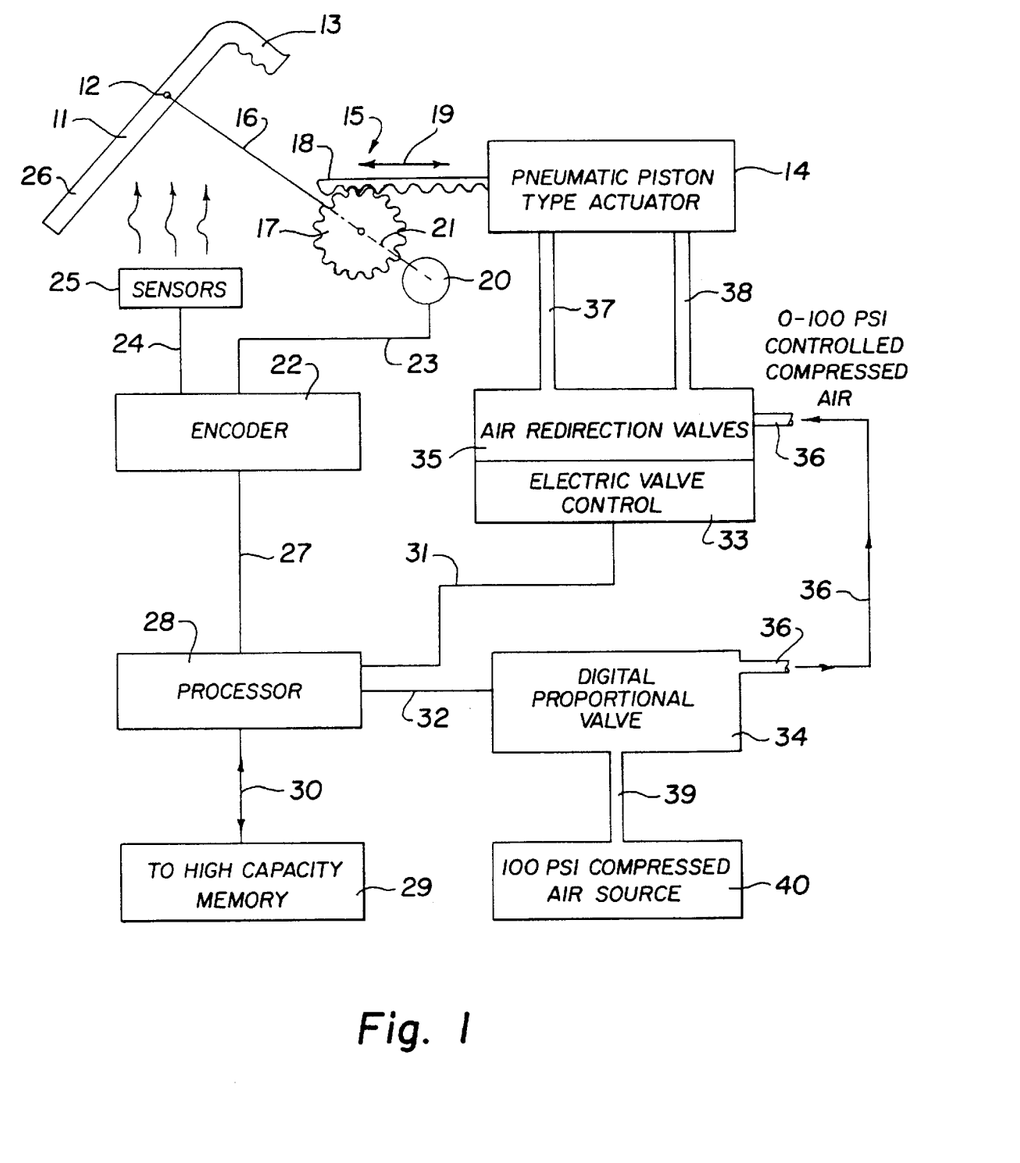
FIG. 1 is a view schematically depicting the tactile force feedback system according to the invention.

Now turning to the drawing, and more particularly FIG. 1 thereof, it will be seen to depict schematically a tactile force feedback system having a simulated instrument, i.e., implement 11 which, as described in the above-described co-pending application, is selectable to represent any of a plurality of selectable medical tools. Pivot 12 represents the swivelable force-imparting feature of the mounting within the trocar which also is described in the co-pending application. Curved handle portion 13 represents the proximal end of the implement 11 and is provided to facilitate manual manipulation and control.

Schematically representing the force-imparting coupling of implement 11 to pneumatic piston-type actuator 14 is a mechanical linkage 15 comprising extending arm 16 mounted to pinion 17 in cooperative engagement with rack 18 such that when a piston within pneumatic actuator 14 moves, a corresponding linear movement represented by arrow 19 is imparted to rack 18 whence it is communicated through pinion 17, extending arm 16 and swivelable force-imparting member 12 to implement 11. It should be noted that this representation is schematic and that a variety of force-imparting couplings could readily be employed.

To provide for ready monitoring of the movement of pinion 17 there is included a conventional electrical sensing member 20 whose sensing relationship to pinion 17 is represented by dashed line 21; and connecting electrical sensing member 20 to encoder 22 is electrical path 23. Also connected to encoder 22 via path 24 are a plurality of additional conventional sensors 25 which are positioned to sense both position and movement of the distal part 26 of implement 11, thus providing means for continuously monitoring such location and movement. The preferred encoder is Xilinx part XC 3030-70-PC44.

As will be evident to those skilled in the art, encoder 22 encodes (preferably digitally) the sensor signals arriving thereat via paths 23 and 24. It then extends such encoded signals via path 27 to processor 28 which preferably is of the field programmable gate array (FPGA) type. An example of such a suitable array is that which is sold under the trademark "Xilinx" by the Xilinx Corporation and is part XC-4005-5-PG156.

Figure 4:
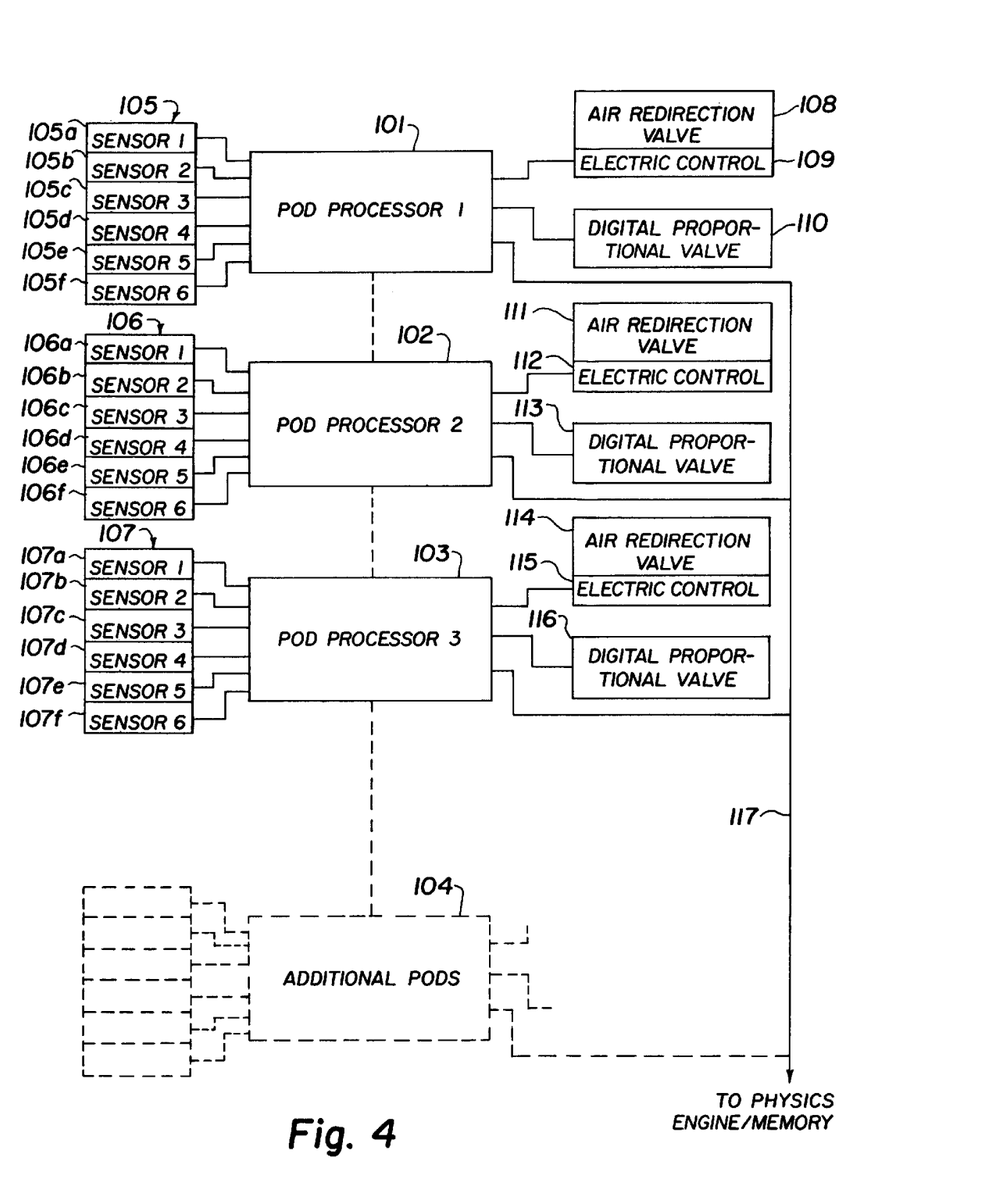
FIG. 4 is a diagram illustrating the grouping of sensors and processors into the aforementioned pods.

As mentioned previously, it is one of the features of the invention hereof that system architecture provides for grouping of sensors and processors into what is known herein as pods. Such is shown in FIG. 4 and described in more detail below. By utilizing high capacity FPGA processors, re-programmability is efficaciously included at a relatively low system level, thereby providing flexibility for individual re-programming to represent differing characteristics of differing sensors for various simulated instruments and tools.

Also connected to processor 28 is high capacity memory 29 which is in bi-directional electrical communication via channel 30. In high capacity memory 29 there are stored indicia representing physical characteristics of the simulated environment in which implement 11 is employed. Thus, for example (and as is set forth in the aforementioned co-pending application to which reference is made above), such indicia include those of internal body landscapes, geometries of organs, their locations within body cavities, their physical characteristics such as resilience, resistance to cutting, pulling, tugging and the like, and other indicia for providing processor information needed to develop signals extended via paths to electric valve control 33 and proportional valve 34.

Electric valve control 33 responds to control signals received via path 31 by actuating air redirection valves 35 to direct air received through air pipe 36 from digital proportional valve 34. Thus, valves 35 controllably extend an internal path from air pipe 36 to either air pipe 37 or air pipe 38. When air is communicated via pipe 38, it results in movement of a piston within actuator 14 to move rack 18 outwardly, and when communicated via pipe 37 to move rack inwardly, thus controlling the direction of movement as represented by bi-directional arrow 19. The degree of force with which such movement is produced is, of course, proportional to the pressure of the air communicated to actuator via pipes 37/38 which in turn is proportional to the air pressure within air pipe 36, the latter being controlled within a range of from 0 to 50 psi by digital proportional valve 34. Thus, although pressure of air received via air pipe 39 from source 40 is essentially constant, under control of force-representing signals received via signal path 32, digital proportional valve 34 controllably reduces such pressure to a variable value preferably lying in the range of from 0 to 50 psi, at which pressure such air is communicated to air pipe 36.

It will now be seen that both the direction of movement of rack 18 and the force which is imparted thereto are determined by electrical signals produced by processor 28 in response to positioning and movement of implement 11 within a simulated body landscape established by memory 29.

The foregoing description relates to the production of unidimensional realistic tactile forces simulating those that would be encountered when utilizing the selected instrument in a selected procedure. However, it will be apparent to those skilled in the art that a real procedure is geometrically three dimensional (i.e., partaking of x, y and z dimensions) and that consequently two additional configurations similar to the one of FIG. 1 are needed to supply simulated forces in the remaining two dimensions. Accordingly, it should be understood that two such additional configurations are included within the scope hereof, the direction of application of forces to the application point (e.g., location 12) of the implement being effectively at right angles to each other.

It should also be understood that associated with implement 11 and force-imparting member 12 (and associated with sensors 25) are elements for sensing longitudinal and rotational movement of instrument 11 along and about its axis and for imparting thereto tactile feedback forces. Such are occasioned through the provision of longitudinal and circumferencial peripheral bar codes which are read by the sensors to monitor such movement. Tactile force feedback is preferably provided through one or more spring and inflatable donut combinations (not shown) that are positioned surrounding implement 11.

Figure 2:
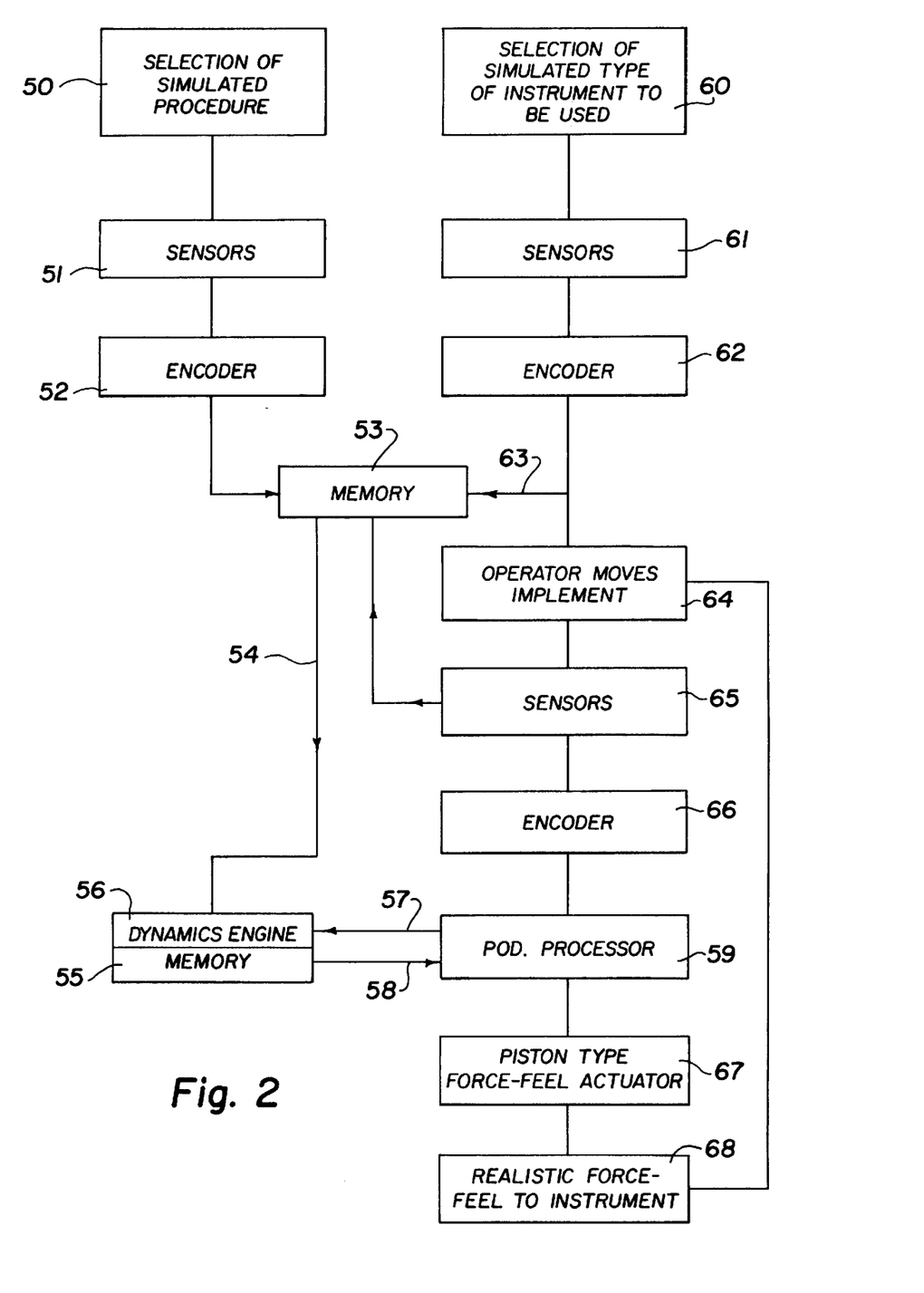
FIG. 2 is a sequential flow diagram illustrating the operative steps employed by the system in operation.

Reference is now made to the diagram of FIG. 2 which is a combination physical element and procedure flow diagram that may be helpful to a clear understanding of the invention. In the upper left portion of the figure there is seen a procedure selector represented by a block 50 that includes the text "Selection of Simulated Procedure." As mentioned above, features of the invention include the provision for optional selection from multiple simulated procedures and multiple simulated instruments. When selection of a procedure to be simulated is made as by turning a knob or touching an inscribed surface on a conventional procedure monitor, sensors 51 are conditioned correspondingly to sense relevant parameters such as position and direction of movement of the simulated instrument within the simulated selected procedure. The outputs from the sensors are processed as described with respect to FIG. 1 by encoding such as by encoder 52 and then at least temporarily stored in memory 53. A path 54 is provided to connect memory 53 with the high capacity memory 55 that contains indicia representing the procedure internal landscape, herein also referred to as the "dynamics engine" 56. As will be observed, the high capacity memory/dynamics engine 55/56 (generally corresponding to high capacity memory 29 in FIG. 1) are bi-directionally interconnected by paths 57 and 58 with pod processor 59 (generally corresponding to processor 28 of FIG. 1.)

The upper part of the path depicted on the right-hand side of FIG. 2 is generally similar to that just described. Thus, it begins with selection of the simulated type of instrument to be used with instrument selector as represented by block 60. When this is accomplished as, for example by turning a selector switch or touching a labelled region of a monitor screen, implement sensors 61 are conditioned accordingly. Then when movement of the simulated instrument occurs, the sensors 61 produce electrical signals that faithfully represent the position and characteristics of a real-life instrument. These electrical signals are encoded as by encoder 62 before being entered via path 63 into memory 53 whence they are communicated as needed by dynamics engine/memory 55/56 over path 54 along with the aforementioned signals relating to selection of the simulated procedure.

When the system user (student) manipulates the simulated instrument implement as represented by rectangle 64, such movement is detected by sensors 65 which develop representative electrical signals that are sent to encoder 66 before being inputted to pod processor 59 where they result in production of the signals that control the piston type force-feel actuator 67 corresponding to pneumatic piston type actuator 14 of FIG. 1. This, then, produces the tactile forces that are communicated (e.g., mechanically coupled) to the simulated instrument implement and result in the aforementioned realistic feel imparted to its movement and operation as represented by coupler rectangle 68.

As mentioned above, one of the features of the invention lies in the seeming realism with which the user senses what appear to be real-life forces. The use of a compressible fluid, e.g. air, contributes importantly to such realism for it assists in the inclusion of a measure of "give" that facilitates simulation of resilience as is in the tissue of human organs. Moreover, air is plentiful, easy to compress and non-toxic.

Figure 3:
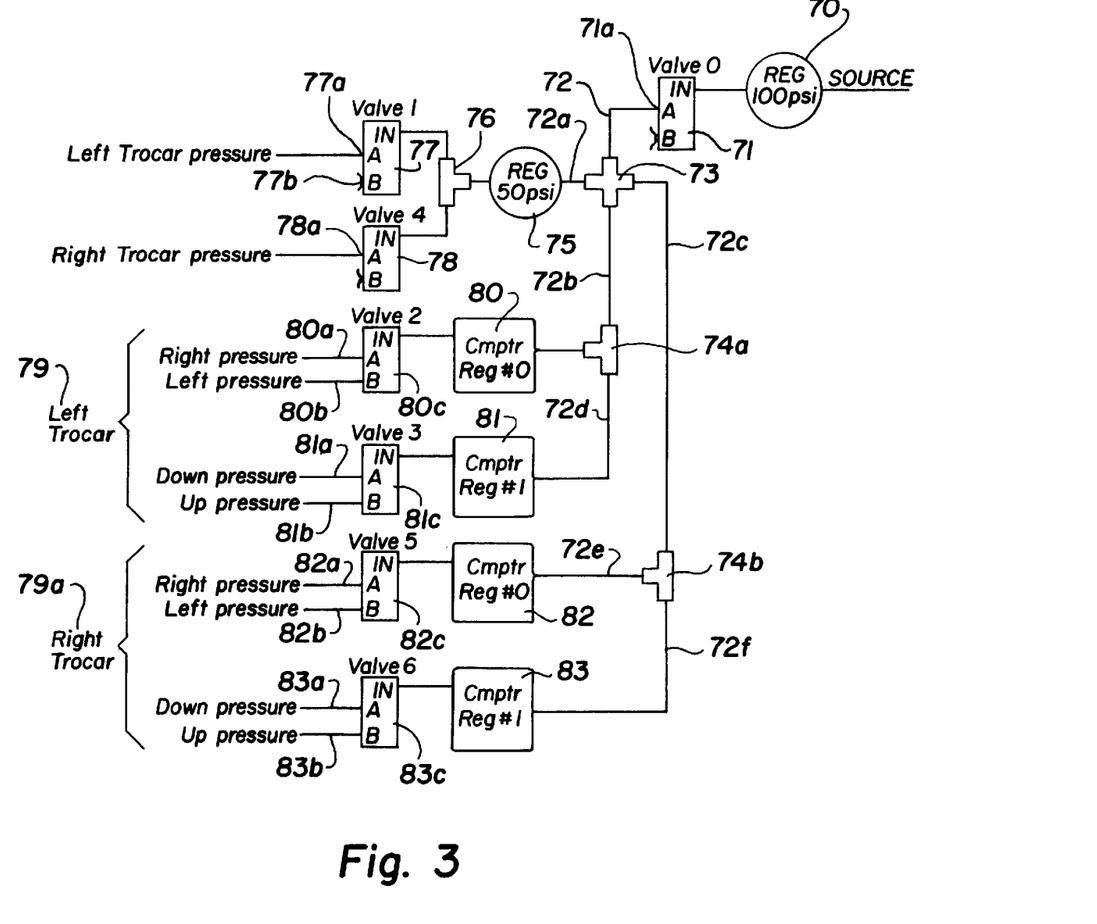
FIG. 3 is a pneumatic control diagram illustrating control and flow of a compressible fluid to actuate force feedback actuators.

An example of a suitable air header is shown in FIG. 3. There, it will be seen is a 100 psi regulated air source 70 to which compressed air is introduced from a conventional air compressor source (not shown). The air from regulated source 70 is conducted via conventional tubing through master shut-off valve 71 and thence through output 71A to regulated air header 72 whence it is distributed via 4-way connector 73 and 3-way connectors 74a–b to header piping extensions 72a–f.

Connected to extension 72a is a 50 psi regulator 75, the output of which is connected via 3-way connector 76 to implement axial movement control valves represented by valve assembly 77 and valve assembly 78.

Before proceeding further with the description of FIG. 3, it may be helpful to recall that in the above-referenced co-pending patent application entitled "MEDICAL PROCEDURE SIMULATOR", right and left trocars identified therein by reference numerals 45 and 46, repectively, are depicted. In the description herein, and particularly that of FIG. 3 hereof, the legends Left Trocar and Right Trocar relate respectively to the left and right trocars of the referenced application.

Output 77a provides air output to urge the above-mentioned implement 11 inwardly through the left trocar, and 77b provides air to urge implement 11 outwardly through the left trocar of both in and out directions lying along the central axis of the implement. Similarly, output 78a provides air output to urge the implement of the right trocar inwardly through its trocar, and 78b provides air output to urge the implement of the right trocar outwardly through its trocar.

In connection with the inward and outward movement of the implement 11, and as referred to above, it has been found preferably to include spring loading to the implement to enhance the life-like feel imparted thereto. Of course it will be evident to one skilled in the art that a friction collar such as an inflatable donut could also be provided instead of or in addition to the spring loading so as to further enhance the life-like feel imparted to inward and outward movement of the implement.

Continuing with the description of FIG. 3, it will be observed that for the left trocar 79 there are provided a pair of computer regulators number 0 and number 1 which are identified with reference numerals 80 and 81, respectively. These correspond to digital proportional valve 34 of FIG. 1, computer regulator 80 corresponding to one valve 34 for providing right and left pressure (as noted) and computer regulator 81 corresponding to another valve 34 for providing up pressure and down pressure as noted in the drawing legend.

Further in connection with FIG. 3, it should be noted that valves 80c and 81c each correspond to a valve assembly 33/35 described above for FIG. 1 and that pair of outputs 80a/80b and 81a/81b correspond to a pair 37/38 of FIG. 1.

For right trocar 79a there are provided computer regulators 82 and 83 and connected valves and outputs 82a–82c and 83a–83c which are similar to regulators 80 and 81 and valve/outputs 80a–80c and 81a–81c. Output 77A provides air output to urge the above-mentioned piston of actuator 14 in FIG. 1 toward the left, and output 78A provides air output to urge the above-mentioned piston of actuator 14 in FIG. 2 toward the right.

Now turning to FIG. 4, it will be observed to depict the aforementioned plurality of pod processor/encoder sensor assemblies corresponding to processor 28 and connected sensors 25 and encoder 22 shown in FIG. 1 as well as pod processor 59 shown in FIG. 2. There, in FIG. 4 are shown Pod Processors 1–3 identified with reference numerals 101–103. Also shown is a dashed line rectangle which represents additional optional pods 104 that may be included to provide other tactile forces as desired. Connected to each processor 101, 102, 103 . . . are 6 sensors 105a–f, 106a–f, 107a–f which generally correspond to sensors 25 in FIG. 1. However, it should be noted that a fewer number of individual sensors may be connected to the processors if sensing needs so suggest.

Each pod processor 101, 102, 103 . . . is also connected to: (1) its own associated air reduction valve/electric control assembly 108/109, 111/112, 114/115 . . . ; (2) its own digital proportional valve 110, 113, 116; and via path 117 to the dynamics engine/memory as represented by rectangle 29 in FIG. 1 and elements 55/56 in FIG. 2. As mentioned above, each pod processor preferably is a Field Programmable Gate Array such as that sold under the identification XC-4005-5-PG156 by the Xilinx Corporation. Since it is fully and readily re-programmable, pods can be easily re-programmed to be reflect different characteristics of simulated instruments and landscapes, thereby providing flexibility and extendibility to the system.

It will now be evident that there has been described herein, an improved force feedback simulator that is flexible, extendible, readily re-programmable and that provides realistic and life-like tactile forces for simulated instruments in simulated procedures, thus contributing to its attractiveness and desirability.

Although the invention hereof has been described by way of a preferred embodiment, it will be evident that other adaptations and modifications may be employed without departing from the spirit and scope thereof. For example, and as mentioned above, the principles hereof could readily be extended to non-medical areas such as flight simulators and pilot training.

The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A method of producing realistic tactile feedback forces in a tool operation simulator comprising:
   (a) selecting a predetermined simulated operational environment,
   (b) defining said predetermined simulated operational environment by defining electrical signals;
   (c) providing a simulator implement simulating a selected tool;
   (d) manually controlling movement of said implement relative to said simulated operational environment;
   (e) positioning a plurality of sensors in sensing relation to said implement, said sensors being responsive to movement of said implement to produce electrical signals representative of movements of an actual tool of the type simulated in an actual environment of the type being simulated;
   (f) providing a plurality of force creating members in force-imparting relation to said implement;
   (g) interconnecting said representative electrical signals and said defining electrical signals with said force-creating members; and
   (h) conditioning said force-creating members to respond to said representative and defining electrical signals to impart proportioned forces to said implement.

2. The method of claim 1 further including providing electronic memory and storing said electrical signals in said memory.

3. The method of claim 2 further including digitizing said defining electrical signals.

4. The method of claim 2 further including digitizing said defining and representative electrical signals.

5. The method of claim 2 further including representing identity of said selected tool by developing a predetermined electrical signal.

6. The method of claim 5 further including providing electrical memory, digitizing said predetermined electrical signal to produce a digitized electrical signal and storing said digitized electrical signal in said electrical memory.

7. The method of claim 1 further including digitizing said defining electrical signals.

8. The method of claim 1 further including digitizing said defining and representative electrical signals.

9. The method of claim 1 further including steps of providing a plurality of different selectable simulated tools and selecting said tool from among said plurality of different selectable simulated tools.

10. The method of claim 9 wherein said step of selecting said tool from among said plurality of different selectable simulated tools is performed by an operator.

11. The method of claim 1 further including representing identity of said selected tool by developing a predetermined electrical signal.

12. The method of claim 1 further including causing said sensors to respond to positioning of said implement for developing position-indicating indicia indicative of the position of said implement within said simulated operational environment.

13. The method of claim 1 further including causing said sensors to respond to positioning of said implement for developing position-indicating electrical signals indicative of the position of said implement within said simulated operational environment.

14. The method of claim 13 further including digitally encoding said position-indicating electrical signals.

15. The method of claim 1 further including rendering said force-creating members fluid responsive.

16. The method of claim 1 further including rendering said force-creating members responsive to compressible fluid.

17. The method of claim 1 further including rendering said force-creating members responsive to compressed air.

18. The method of claim 1 further comprising a step of including within said force-creating members compressed air responsive pistons.

19. The method of claim 18 further comprising a step of including within said force-creating members bi-directional pistons.

20. The method of claim 19 further including a step of mechanically connecting said force-creating members to said simulated instrument.

21. A system for producing realistic force feedback in simulated situations comprising:
   (a) a predetermined landscape environment;
   (b) an instrument adapted for movement within said environment;
   (c) sensing means including means for sensing the position of said instrument, a plurality of sensors for sensing the movement of said instrument within said environment and for producing electrical indicia indicative of the position and movement of said instrument; and
   (d) force simulation means responsive to said electrical indicia for imparting to said instrument simulated real-life forces representing said movement and reflecting said position of said instrument.

22. A method of producing realistic tactile force feedback comprising:
   (a) disposing a predetermined simulated landscape environment;
   (b) positioning a simulated instrument at least partly within said simulated landscape environment;
   (c) sensing the position of said instrument within said simulated landscape environment;
   (d) producing electrical indicia representing said position of said simulated instrument within said simulated landscape environment;
   (e) processing said electrical indicia to product tactile force feedback forces representative of real-life analogs of said simulated instrument and simulated movement of said instrument; and
   (f) applying said tactile force feedback forces to said simulated instrument to impart to said simulated instrument a real-life feel.

* * * * *

UNITED STATES PATENT AND TRADEMARK OFFICE
CERTIFICATE OF CORRECTION

PATENT NO. : 5,771,181
DATED : June 23, 1998
INVENTOR(S) : Robert S. Moore, Lewis John Harthan III & Darrell L. Livezey It is certified that error appears in the above-identified patent and that said Letters Patent is hereby corrected as shown below:

On the title page item [54] and col. 1, line 1, before "GENERATION" insert --FORCE FEEDBACK--.

In the Abstract"

Line 1, after "A system" insert --and method--.

Signed and Sealed this

First Day of September, 1998

Attest:

BRUCE LEHMAN

Attesting Officer

Commissioner of Patents and Trademarks